(12) United States Patent
Manjunath et al.

(10) Patent No.: US 11,397,950 B2
(45) Date of Patent: Jul. 26, 2022

(54) SYSTEMS AND METHODS FOR AUTHENTICATING AN ELECTRONIC TRANSACTION

(71) Applicant: Microsoft Technology Licensing, LLC, Redmond, WA (US)

(72) Inventors: Murali Krishna Manjunath, Duvall, WA (US); Yuting Jia, Redmond, WA (US); Adam Reinhardt, Bellevue, WA (US); Yung-Wen Liu, Redmond, WA (US); Anand Ravindra Oka, Bellvue, WA (US); Jayaram N. M. Nanduri, Isaaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 16/601,091

(22) Filed: Oct. 14, 2019

(65) Prior Publication Data

US 2020/0402054 A1 Dec. 24, 2020

Related U.S. Application Data

(60) Provisional application No. 62/864,239, filed on Jun. 20, 2019.

(51) Int. Cl.
*G06Q 20/40* (2012.01)
(52) U.S. Cl.
CPC ....... *G06Q 20/4014* (2013.01); *G06Q 20/405* (2013.01)
(58) Field of Classification Search
None
See application file for complete search history.

(56) References Cited

U.S. PATENT DOCUMENTS 7,096,215 B2 8/2006 Bates et al.
7,346,927 B2 3/2008 Hillmer
(Continued)

FOREIGN PATENT DOCUMENTS

WO WO-2017011488 A1 * 1/2017 .......... G06Q 20/405

OTHER PUBLICATIONS

Dharwa, J. N., & Patel, A. R. (2011). A data mining with hybrid approach based transaction risk score generation model (TRSGM) for fraud detection of online financial transaction. International Journal of Computer Applications, 16(1), n/a. doi:http://dx.doi.org/10.5120/1977-2651 on Mar. 11, 2022 (Year: 2011).*

(Continued)

*Primary Examiner* — Kito R Robinson
(74) *Attorney, Agent, or Firm* — ArentFox Schiff LLP

(57) ABSTRACT

Devices and methods for securing electronic transactions in a computing network are configured to receive a transaction, access transaction contextual data for the transaction, and apply one or more authentication decision rules to the transaction contextual data to determine initial authentication assessment information for the transaction. Further, aspects are configured to convert the initial authentication assessment information into a condensed authentication assessment indicator having an assessment value selected from a plurality of assessment values based on an assessment value definition, and transmit the condensed authentication assessment indicator. Also, aspects receive a transaction authentication decision based in part on the condensed authentication assessment indicator, and process or deny processing of the transaction based on the transaction authentication decision.

23 Claims, 8 Drawing Sheets

(56) References Cited

U.S. PATENT DOCUMENTS

| | | |
|---|---|---|
| 7,383,580 B1 | 6/2008 | Frentz |
| 7,765,400 B2 | 7/2010 | Costea et al. |
| 8,307,443 B2 | 11/2012 | Wang et al. |
| 8,635,117 B1 | 1/2014 | Acuna-Rohter |
| 8,875,267 B1 | 10/2014 | Kaufman et al. |
| 9,514,293 B1 | 12/2016 | Moritz et al. |
| 2003/0200184 A1* | 10/2003 | Dominguez ........ G06Q 20/3674 705/78 |
| 2008/0195829 A1 | 8/2008 | Wilsey |
| 2011/0270756 A1 | 11/2011 | Tullis et al. |
| 2012/0130898 A1* | 5/2012 | Snyder ............... G06Q 20/4014 705/44 |
| 2012/0144472 A1 | 6/2012 | Emigh et al. |
| 2014/0172706 A1 | 6/2014 | Condry et al. |
| 2016/0260100 A1 | 9/2016 | Wiesman |
| 2016/0379135 A1* | 12/2016 | Shteingart ............. G06N 20/00 706/12 |
| 2017/0132636 A1 | 5/2017 | Caldera |
| 2017/0161742 A1* | 6/2017 | Martin-Bale ......... G06Q 20/02 |
| 2018/0033006 A1 | 2/2018 | Goldman et al. |
| 2018/0034626 A1 | 2/2018 | Yamada et al. |
| 2019/0140847 A1* | 5/2019 | Piel ....................... H04L 9/0891 |
| 2020/0126085 A1* | 4/2020 | Roche ................. G06Q 20/202 |
| 2021/0150531 A1 | 5/2021 | Oka et al. |

OTHER PUBLICATIONS

Card and Identity Theft: Debit cards: The next fraud frontier. (2006). Cards International, , 14. Retrieved from https://dialog.proquest.com/professional/docview/198889596?accountid=131444 on Mar. 11, 2022 (Year: 2006).*

Agarwal, Akarsh, "A Simple Introduction to Understand the Blockchain", Retrieved from: https://mlgblockchain.com/intro-blockchain.html, Feb. 25, 2017, 6 Pages.

"International Search Report and Written Opinion Issued In PCT Application No. PCT/US2018/038379", dated Sep. 17, 2018, 10 Pages.

Xu, Jennifer J., "Are Blockchains Immune to all Malicious Attacks?", In Book Financial Innovation, Dec. 10, 2016, 9 Pages.

"International Search Report and Written Opinion Issued in PCT Application No. PCT/US20/031545", dated Jul. 27, 2020, 11 Pages.

"Non Final Office Action Issued in U.S. Appl. No. 15/844,095", dated Mar. 6, 2020, 10 Pages.

"Notice of Allowance Issued in U.S. Appl. No. 15/844,095", dated Sep. 10, 2020, 13 Pages.

"Office Action Issued in European Patent Application No. 18739700.5", dated Nov. 25, 2021, 9 Pages.

* cited by examiner

| Category | Value | Value Definition | Value Insight |
|---|---|---|---|
| Transaction Assessment | 1 | High confidence in authenticity of transaction | First evaluating entity has high confidence and/or predicts zero to near zero possibility of non-authentic transaction. May be predicated based on user id, device id, location of user and/or device, product/good/service involved in the transaction, and/or other attributes. May be treated as a highly authentic transaction by the second evaluating entity. |
| | 0 | Not high confidence in authenticity of transaction | Neither high nor low confidence by first evaluating entity. Second evaluating entity to perform normal assessment. |
| Device History | 1 | Device known from previous transaction | Known device with predicted/likely low risk of non-authentic transaction. |
| | 0 | Device not known from previous transaction; or, known device with past history of non-authentic transaction(s) | New device and hence risk level is unestablished; known device with risky authenticity history. |
| Shipping Location History | 1 | Address associated with transaction was previously used/ known | Known shipping location and likely low risk / high level of authenticity |
| | 0 | Address not previously used/ known | New transaction-initiating device and/or user with this address or old transaction-initiating device and/or user with new address |
| Transaction Instrument on File | 1 | Transaction made using known instrument | Transaction-initiating entity is known to and has an account with first evaluating entity |
| | 0 | Transaction made as a guest | Transaction-initiating entity is unknown |

| Category | Value | Value Definition | Value Insight |
|---|---|---|---|
| Transaction Assessment | 1 | Estimated non-authenticity rate is less than 0.1% | Extremely low risk of non-authentic transaction |
| | 2 | Estimated non-authenticity rate is between 0.1% and 5% | Low to moderate risk of non-authentic transaction |
| | 3 | Estimated non-authenticity rate is more than 5% | Moderate to high risk of non-authentic transaction |
| User Assessment | 1 | User has previous transaction but no non-authentic ones | Known user, low risk |
| | 2 | User does not have any previous transaction | New user, undetermined risk |
| | 3 | User has previous non-authentic transaction | Know user with higher risk |
| Location Assessment | 1 | Location/city where transaction originates is same as known city associated with user | Local transaction, low risk |
| | 2 | Location/city where transaction originates is not same as known city associated with user | Not low risk, use normal evaluation |
| Combination | 1 | Transaction assessment=1, User assessment = 1 | Low risk as user is known and has good history |
| | 2 | Transaction assessment=1, User assessment = 2 | New user, but lower risk due to other know parameters |
| | 3 | Transaction assessment=1, User assessment = 3 | Low risk even with non-authentic transaction in history |
| | 4 | Transaction assessment=2, User assessment = 1 | User known with moderate risk of non-authentic txn; use normal evaluation |
| | 5 | Transaction assessment=2, User assessment = 2 | New user with moderate riskiness; use normal evaluation |
| | 6 | Transaction assessment=2, User assessment = 3 | User had non-authentic txn with moderate riskiness; use conservative evaluation |
| | 7 | Transaction assessment=3, User assessment = 1 | High risk known user with no history of non-authentic txn; txn compromise likely; evaluate using add'l info (e.g., location assess.) |
| | 8 | Transaction assessment=3, User assessment = 2 | High risk unknown user, so use conservative evaluation |
| | 9 | Transaction assessment=3, User assessment = 3 | High risk known user with non-authentic txn history; considered high risk of non-auth txn, so exercise caution |

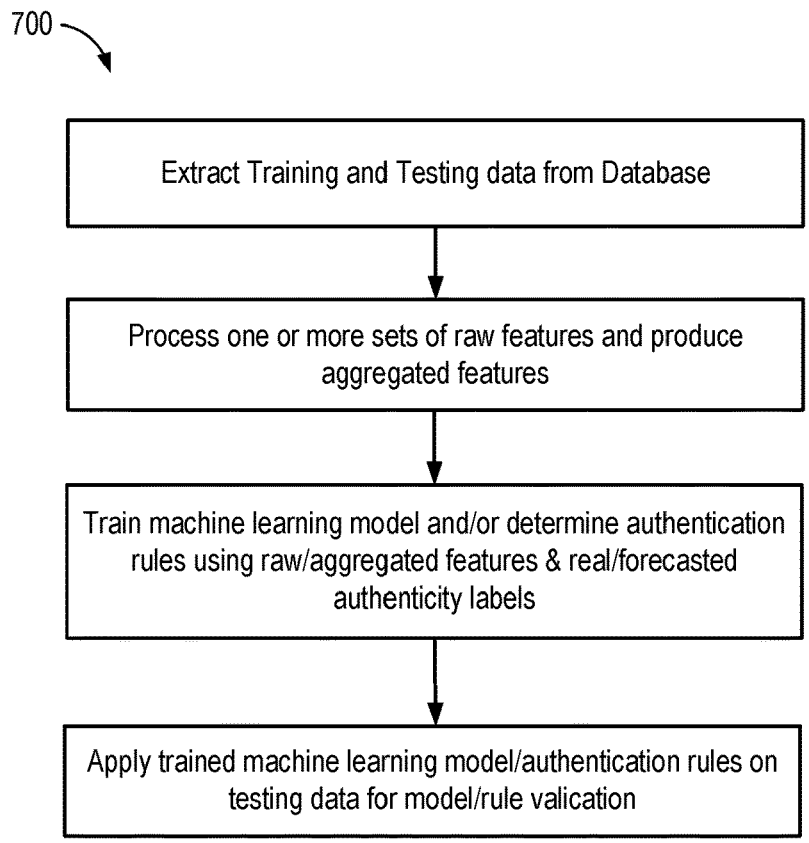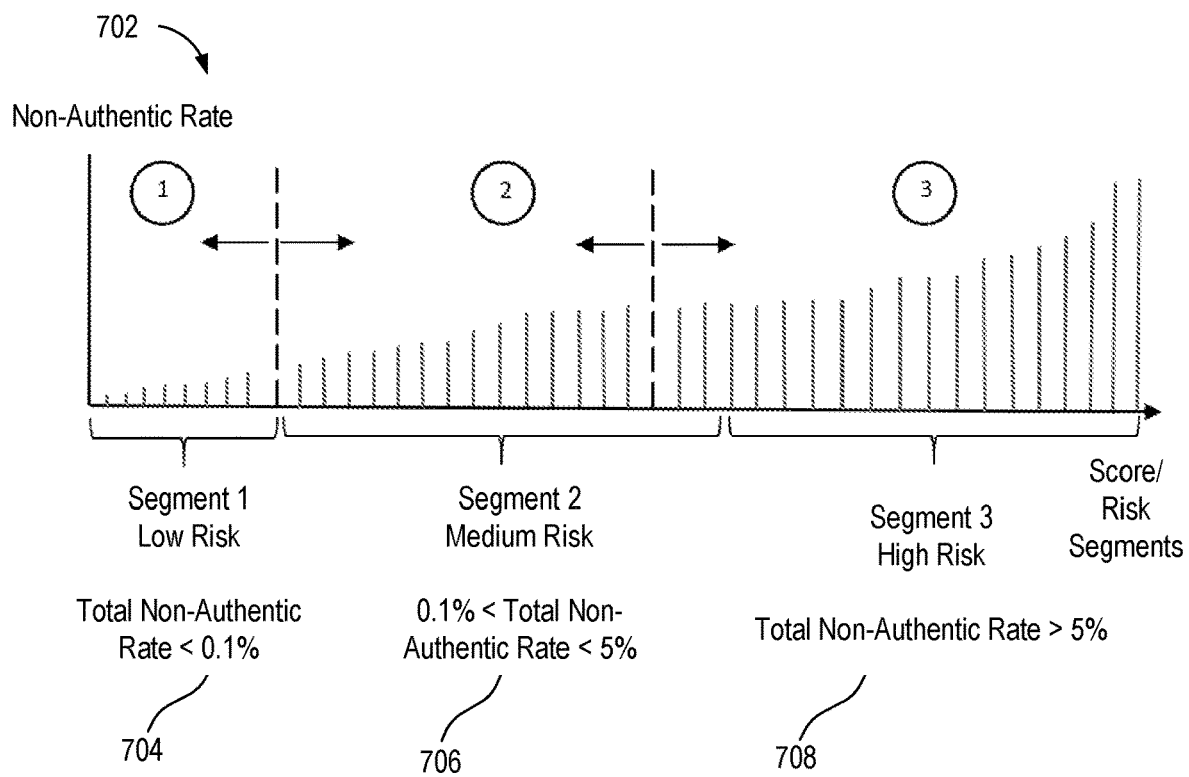
FIG. 7

SYSTEMS AND METHODS FOR AUTHENTICATING AN ELECTRONIC TRANSACTION

BACKGROUND

The present disclosure relates to providing security in a digital network, and more particularly, to authenticating an electronic transaction.

Non-authentic transactions or transactions having non-authentic or invalid data are known to occur within an electronic network. Conventionally, each entity involved in the electronic transaction may attempt to evaluate transaction authenticity based on the information the entity has available. Some parties may outsource authenticity detection to third party providers. However, the ability of any entity to determine whether a transaction is authentic may be limited.

Thus, there is a need in the art for improvements in authenticating an electronic transaction in a transaction network.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions; at least one processor configured to communicate with the memory; an operating system in communication with the memory and the at least one processor, wherein the operating system is operable to: receive a transaction; access transaction contextual data for the transaction; apply one or more authentication decision rules to the transaction contextual data to determine initial authentication assessment information for the transaction; convert the initial authentication assessment information into a condensed authentication assessment indicator having an assessment value selected from a plurality of assessment values based on an assessment value definition; transmit the condensed authentication assessment indicator for the transaction; receive a transaction authentication decision based in part on the condensed authentication assessment indicator; and process or deny processing the transaction based on the transaction authentication decision.

Another example implementation relates to a method of securing electronic transactions in a computing network, comprising: receiving a transaction; accessing transaction contextual data for the transaction; applying one or more authentication decision rules to the transaction contextual data to determine initial authentication assessment information for the transaction; converting the initial authentication assessment information into a condensed authentication assessment indicator having an assessment value selected from a plurality of assessment values based on an assessment value definition; transmitting the condensed authentication assessment indicator for the transaction; receiving a transaction authentication decision based in part on the condensed authentication assessment indicator; and processing or denying the processing of the transaction based on the transaction authentication decision.

Another example implementation relates to a computer-readable medium comprising stored instructions executable by a processor to secure electronic transactions in a computing network, comprising instructions executable to: receive a transaction; access transaction contextual data for the transaction; apply one or more authentication decision rules to the transaction contextual data to determine initial authentication assessment information for the transaction; convert the initial authentication assessment information into a condensed authentication assessment indicator having an assessment value selected from a plurality of assessment values based on an assessment value definition; transmit the condensed authentication assessment indicator for the transaction; receive a transaction authentication decision based in part on the condensed authentication assessment indicator; and process or deny processing the transaction based on the transaction authentication decision.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings, where dashed lines may indicate optional components or actions:

FIG. 4 is an example chart illustrating a standard format for a binary signal for the first evaluating entity assessment information in accordance with an implementation of the present disclosure;

FIG. 5 is an example chart illustrating a standard format for a single indicator value for the first evaluating entity assessment information in accordance with an implementation of the present disclosure;

FIG. 7 is an example block diagram illustrating a process of building machine learning models and/or setting decision rules and a graph illustrating different levels of authenticity in accordance with an implementation of the present disclosure.

DETAILED DESCRIPTION

Figure 1:
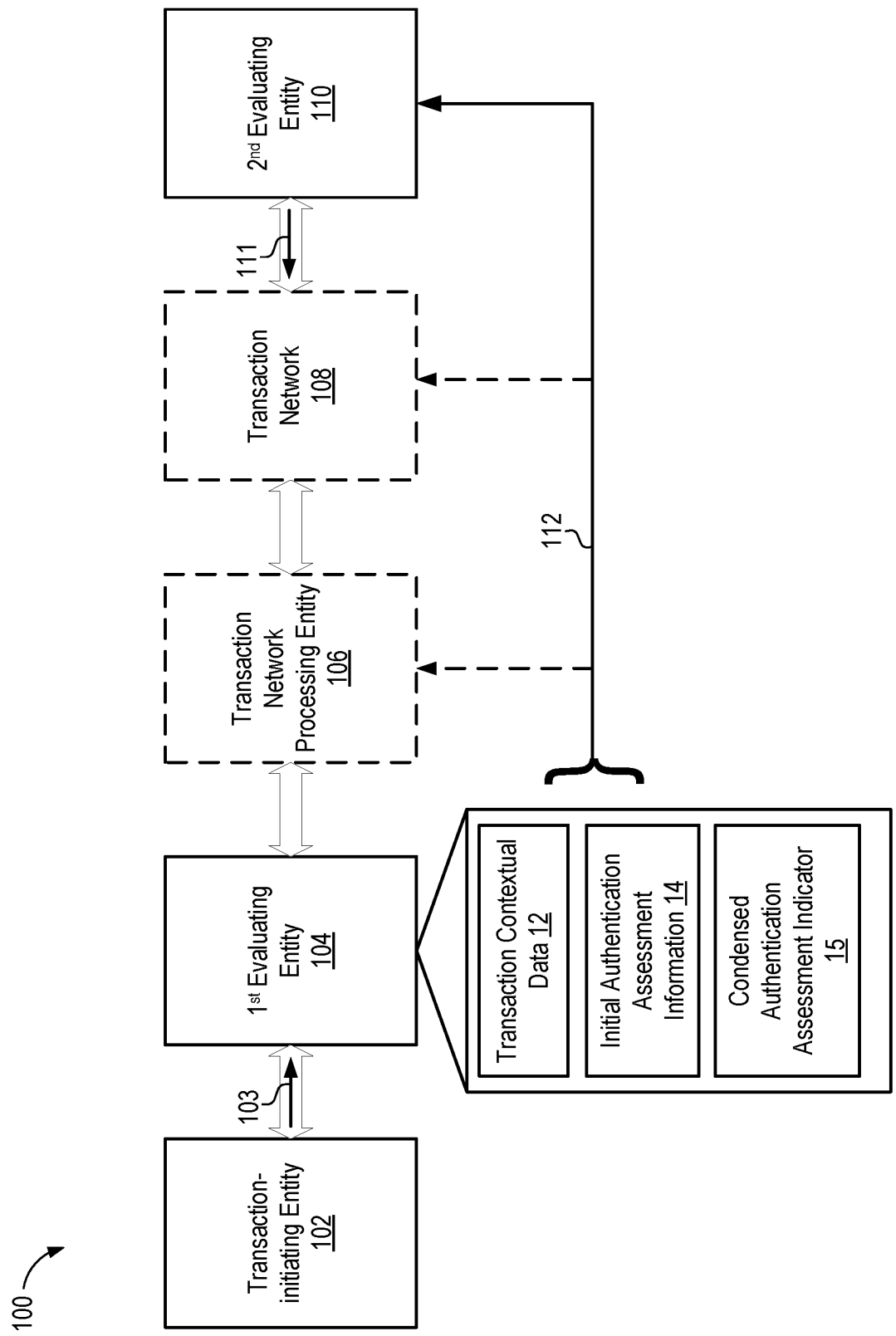
FIG. 1 is a schematic block diagram of an example system for evaluating a transaction in accordance with an implementation of the present disclosure.

This disclosure relates to devices and methods for authenticating and/or securing an electronic transaction in an electronic transaction network. The devices and methods may provide improved real-time authentication of the electronic transaction. The devices and methods may share the transaction contextual data acquired by a first evaluating entity, which receives the electronic transaction, with a second evaluating entity, which ultimately approves the transaction, so that the second evaluating entity may increase efficiency in an ability to detect an invalid or non-authentic transaction and/or invalid or non-authentic transaction data. In an implementation, the transaction may include transaction data, while the transaction contextual data may be additional associated information available to the first evaluating entity, and not typically available to the second evaluating entity. As such, the sharing of the transaction contextual data acquired by a first evaluating entity allows the second evaluating entity to make a better evaluation of the transaction based on the additional information represented by the transaction contextual information from the first evaluating entity. As a result, the devices and methods of the present disclosure provide an increase in efficiency and/or accuracy in validating electronic transactions that are authentic while, at the same time, increasing an efficiency and/or accuracy in identifying invalid or non-authentic electronic transactions. For example, in an electronic transaction processing network that processes millions of electronic transactions per day, removing non-authentic transactions from the network, as described by the present disclosure, may provide dramatic gains in computer processing efficiency, in computer memory resource utilization, and in network communication resource utilization, among other technical gains, by eliminating the unnecessary processing of invalid or non-authentic transactions.

In an implementation, the transaction contextual data acquired by the first evaluating entity may be analyzed and used to generate initial authentication assessment information, which may be converted into a condensed authentication assessment indicator that is shared with the second evaluating entity. For example, the initial authentication assessment information may be inferred data attributes in response to applying one or more authenticity decision rules to the transaction contextual information. The initial authentication assessment information may include or may then be converted, according to one or more specific assessment value definitions, into the condensed authentication assessment indicator having an assessment variable value selected from a plurality of assessment variable values based on the corresponding assessment value definition. Moreover, the condensed authentication assessment indicator may incorporate a standard format, e.g., normalized variables and normalized variable values, in order for the initial authentication assessment information to be quantitative and have quantitative and consistent information and/or definitions that may be interpreted in the same way by all parties, namely the first evaluating entity that will share the initial authentication assessment information and the second evaluating entity that will accept and use the initial authentication assessment information that is shared.

In the implementation, the initial authentication assessment information may be used by the second evaluating entity to make a transaction decision by using the additional information (e.g., relative to the transaction data of the transaction, or other information about the transaction typically available to the second evaluating entity) represented by the initial authentication assessment information. Thus, the present disclosure may improve accuracy and efficiency in evaluating and approving transactions in an electronic network.

Referring now to FIG. 1, illustrated is a schematic block diagram of an example system 100 for evaluating an electronic transaction for authenticity, e.g., in order to detect an invalid or non-authentic electronic transaction. For example, a transaction-initiating entity 102, such as a user computer device, may generate an electronic transaction 103 with the first evaluating entity 104, such as an entity computer device. For example, the electronic transaction 103 may include, but is not limited to, one or more sets of transaction data related to an exchange between the transaction-initiating entity 102 and the first evaluating entity 104.

In processing the transaction 103, the first evaluating entity 104 may collect transaction contextual data 12 such as, but not limited to, data or attributes different from the data of the of the payment instrument, product, device, Internet Protocol (IP) location, and/or device. The first evaluating entity 104 may use the transaction contextual data 12 to evaluate the likelihood of a transaction being non-authentic or including invalid data. When the evaluation returns a high likelihood of authenticity or validity, the first evaluating entity 104 submits the transaction 103 to the second evaluating entity for authorization For example, he first evaluating entity 104 may submit the transaction 103 through the system 100 via a transaction network processing entity 106 and a transaction network 108. The transaction network processing entity 106 may manage or control the routing of the transaction 103 through the system 100 by choosing the transaction network 108, in some cases from a plurality of different potential transaction networks, and/or based on the destination, e.g., the second evaluating entity 110. An additional authentication evaluation is done by the second evaluating entity 110, resulting in an authentication decision 111 by the second evaluating entity 110 to either authorize or decline the transaction 103 submitted by the first evaluating entity 104. The authentication decision 111 of the second evaluating entity 110 is passed back through the transaction network 108 and the transaction network processing entity transaction network processing entity 106, and ultimately is received by the first evaluating entity 104.

Authenticity evaluations done post-first evaluating entity, at the second evaluating entity level, are based on a different data set than the evaluation done at the first evaluating entity level. For example, the different information may include information that only the second evaluating entity has access to, such as but not limited to a transaction history associated with the transaction-initiating entity 102 or a customer/user thereof, and/or an authentication history associated with the transaction-initiating entity 102 or a customer/user thereof.

To supplement this information at the second evaluating entity 110, the devices and methods may share the transaction contextual data 12 acquired by the first evaluating entity 104 and/or the initial authentication assessment information 14 and/or the condensed authentication assessment indicator 15 for the transaction 103 with the second evaluating entity 110 so that the second evaluating entity 110 may increase efficiency in an ability to detect and block non-authentic or invalid transactions resulting in an increase in the approval of good (e.g., valid, authenticated) transactions. The transaction contextual data 12, initial authentication assessment information 14, and/or the condensed authentication assessment indicator 15 may allow the second evaluating entity 110 to make a better evaluation of the transaction 103 based on this additional information.

Sharing this additional transaction contextual data 12 and/or initial authentication assessment information 14 and/or the condensed authentication assessment indicator 15 may be achieved by establishing a secondary data channel 112 from the first evaluating entity 104 or first evaluating entity's authenticity solution provider to the second evaluating entity 110; or establishing a data channel 112 from the first evaluating entity 104 or first evaluating entity's authenticity solution provider to a conduit or a trust knowledge broker which may be the same as or integrated with the transaction network processing entity 106 or transaction network 108, which will then be delivered to the second evaluating entity 110 either in a secondary data channel 112 or the primary authorization data channel used by the transaction 103 and authentication decision 111.

In one example implementation, the electronic transaction may be a purchase transaction by a customer with a merchant. For instance, in a non-limiting implementation, the transaction may be a card-not-present transaction with a merchant conducted via a website of the merchant. In this case, the transaction may be forwarded from the website to the merchant. In a purchase transaction, particularly a card-not-present online transaction, the merchant may collect transaction contextual data such as, but not limited to, attributes of the payment instrument (e.g., account number, expiration date, security code, address information), customer information (e.g., customer name associated with the payment instrument), product identification information, transaction-initiating device information (e.g., device identification information, device Internet Protocol (IP) address, device geographic location), customer/cardholder location information (e.g., home address), customer details (e.g., login identity, e-mail address, and/or telephone number), product details (e.g., product type, profit margin, and/or revocability), location (e.g., IP geolocation, device geolocation, and/or shipping address), device fingerprinting (e.g., operating system (OS) configuration, hardware configuration, browser or device configuration), and/or any other information related to or identifying the customer, the payment instrument, the goods/services involved in the transaction, and/or the computer devices involved in the transaction. The merchant may use the transaction contextual data to evaluate the likelihood of a transaction being authentic. When the merchant evaluation returns likelihood of authenticity above an authenticity threshold, the merchant submits the transaction to an issuing bank for authorization via, for example, a payment processor, such as an acquiring processor, and via a transaction network. The issuing bank is a bank associated with the payment instrument identified in the transaction contextual data. An additional authentication evaluation is done by the issuing bank, which may be combined with a determination of available credit and/or credit rating associated with the customer, etc., resulting in a decision by the issuing bank to either authorize or decline the transaction submission by the merchant. Authenticity evaluations done post-merchant, at the issuing bank level, are based on a different data set than the evaluation done at merchant level For example the issuing bank has access to the cardholder's purchase history and credit history but is not able to utilize the transaction contextual data a first evaluating entity collects. Further, the issuing bank may have access to the complete cardholder purchase and/or credit history, debt status, address of the card holder used for billing, and purchase pattern data, among others. The decision of the issuing bank is passed back through transaction network and/or acquiring processor to the merchant, who may then deny or accept the electronic transaction 103.

Figure 2:
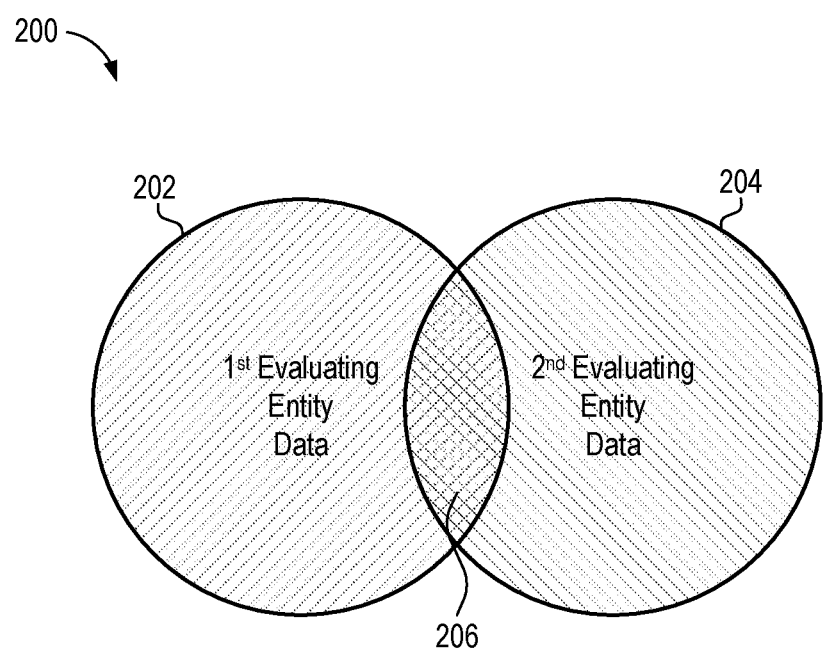
FIG. 2 is an example of graph illustrating different data from a transaction in accordance with an implementation of the present disclosure.

Referring now to FIG. 2, illustrated therein is an example graph 200 illustrating different data from a transaction. First evaluating entity data 202 may include the transaction contextual data 12 and/or initial authentication assessment information 14 and/or the condensed authentication assessment indicator 15 (FIG. 1) acquired by the first evaluating entity 104 (FIG. 1). Further examples of transaction contextual data 12 may include, but is not limited to, customer details (e.g., login identity, e-mail address, and/or telephone number), product details (e.g., product type, profit margin, and/or revocability), location (e.g., IP geolocation, device geolocation, and/or shipping address), and/or device fingerprinting (e.g., operating system (OS) configuration, hardware configuration, browser or device configuration). Second evaluating entity data 204 may include data the second evaluating entity 110 (FIG. 1) may use when evaluating a transaction. For example, second evaluating entity data 204 may include, but is not limited to, initiating entity or user transaction and/or authentication history, transaction pattern, data relating to capability of validly completing the transaction, etc. The intersection data 206 of the first evaluating entity data 202 and the second evaluating entity data 204 may include, for example, the certain transaction detail data, and/or initiating entity or user transaction and/or authentication data.

Figure 3:
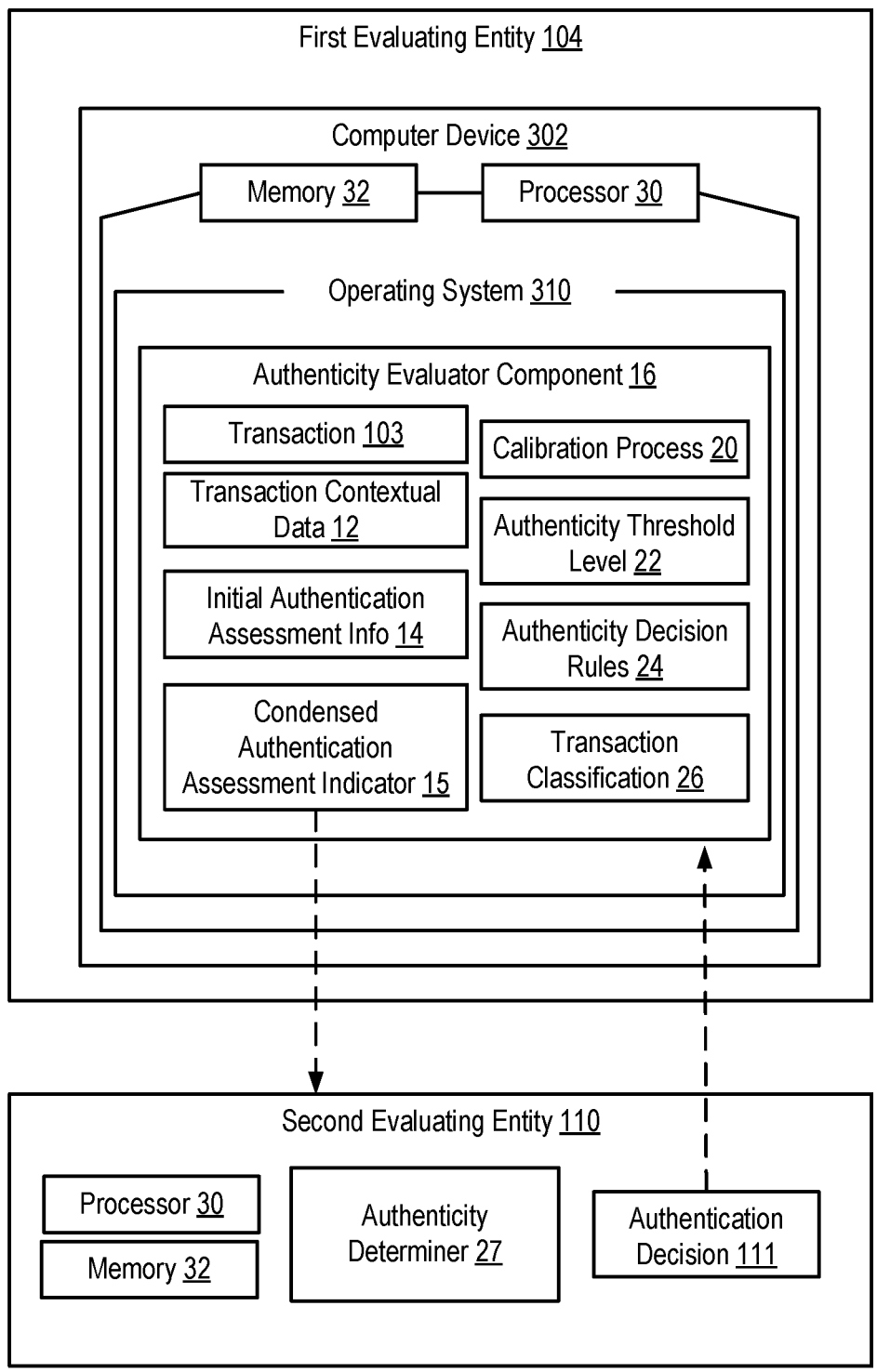
FIG. 3 is a schematic block diagram of an example computer device for use for evaluating a transaction in accordance with an implementation of the present disclosure.

Referring now to FIG. 3, illustrated therein is an example computer device 302 for use by the first evaluating entity 104 to evaluate one or more transactions 103 received from customer purchasers 102 (FIG. 1). Computer device 302 may access the transaction contextual data 12 and/or initial authentication assessment information 14 and/or the condensed authentication assessment indicator 15 and may generate initial authentication assessment information 14 for the transaction 103 using the transaction contextual data 12. Computer device 302 may transmit the transaction contextual data 12 and/or initial authentication assessment information 14 and/or the condensed authentication assessment indicator 15 to one or more third parties, such as, but not limited to, transaction network processing entity 106 (FIG. 1), transaction network 108 (FIG. 1), and/or second evaluating entity 110 (FIG. 1). As such, the transaction contextual data 12 and/or initial authentication assessment information 14 and/or the condensed authentication assessment indicator 15 may aid the second evaluating entity 110 in detecting and blocking non-authentic or invalid transactions 103, resulting in an increase in the approval of good transactions 103.

Computer device 302 may include any mobile or fixed computer device, which may be connectable to a network. Computer device 302 may be, for example, a computer device such as a desktop or laptop or tablet computer, an internet of things (IOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 302 may include an operating system 310 executed by processor 30 and/or memory 32. Memory 32 of computer device 302 may be configured for storing data and/or computer-executable instructions defining and/or associated with operating system 310, and processor 30 may execute such data and/or instructions to instantiate operating system 310. An example of memory 32 can include, but is not limited to, a type of memory usable by a computer, such as random access memory (RAM), read only memory (ROM), tapes, magnetic discs, optical discs, volatile memory, non-volatile memory, and any combination thereof. An example of processor 30 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 310 may include an authenticity evaluator component 16 that receives one or more transactions 103. The transactions 103 may be, for example, but are not limited to, a credit card transaction. In a non-limiting implementation, the transactions 103 may be a card-not-present transaction with a merchant conducted via a website of the merchant.

Authenticity evaluator component 16 may access transaction contextual data 12 associated with the transactions 103. Transaction contextual data 12 may include, but is not limited to, customer details (e.g., login identity, e-mail address, and/or telephone number), product details (e.g., product type, profit margin, and/or revocability), location (e.g., IP geolocation, device geolocation, and/or shipping address), and/or device fingerprinting (e.g., operating system (OS) configuration, hardware configuration, browser or device configuration). Authenticity evaluator component 16 may generate initial authentication assessment information 14 and/or the condensed authentication assessment indicator 15 from the transaction contextual data 12 associated with the transactions 103.

Authenticity evaluator component 16 may transmit the transaction contextual data 12 and/or initial authentication assessment information 14 and/or the condensed authentication assessment indicator 15 to one or more of an transaction network processing entity 106, a transaction network 108, and/or an second evaluating entity 110, so that the transaction contextual data 12 and/or initial authentication assessment information 14 and/or the condensed authentication assessment indicator 15 may be used by the second evaluating entity 110 to make a better evaluation of the transaction 103 based on the additional information.

Sharing this additional transaction contextual data 12 may be achieved by establishing a secondary data channel 112 from the first evaluating entity 104 or first evaluating entity's authenticity solution provider to the second evaluating entity 110; or establishing a data channel from the 104 first evaluating entity or first evaluating entity's authenticity solution provider to a conduit or a trust knowledge broker which may be the same as or integrated with the transaction network processing entity 106 or transaction network 108, which will then be deliver to the second evaluating entity 110 either in a secondary data channel or the primary authorization data channel.

Each of these methods may provide varied level of flexibility for the amount and format of data that may be transmitted. Where available, the transaction contextual data 12 may be transmitted in the original and/or raw form, such as, IP address and/or e-mail ID may be shared. Second evaluating entity 110 will then have to use this raw data as inputs into their assessment methodologies. However, there may be difficulties in sharing raw data attributes since raw data attributes poses risk on privacy and/or competitive data between first evaluating entities 104; technical ability of the system may not support accepting and processing the additional raw attributes; and/or the channel used for transmitting may be constrained on amount and format of data.

To solve for such constrained environments, authenticity evaluator component 16 may generate initial authentication assessment information 14 and/or condensed authentication assessment indicator 15 to share from the first evaluating entity 104 to one or more of an transaction network processing entity 106, a transaction network 108, and/or an second evaluating entity 110. The initial authentication assessment information 14 and/or the condensed authentication assessment indicator 15 may be inferred data attributes in response to applying one or more authenticity decision rules 24 to the transaction contextual data 12.

Authenticity evaluator component 16 may apply one or more authenticity decision rules 24 to the transaction contextual data 12 to determine a level of authenticity for the transaction 103 relative to an authenticity threshold level 22. The one or more authenticity decision rules 24 may include, for example, a trained machine learning model and/or a set of rules to determine a level of authenticity for the transaction 103 and/or to classify the transaction 103. For example, the level of authenticity may be one of a low authenticity, a medium authenticity, or a high authenticity relative to the authenticity threshold level 22. With machine learning models, the level of authenticity may be defined based on one or more condensed authentication assessment indicators 15 of the initial authentication assessment information 14. The level of authenticity may be used to determine a transaction classification 26 to approve, challenge, or reject the transaction 103.

The initial authentication assessment information 14 may include or be converted into the form of the condensed authentication assessment indicator 15 computed by the authenticity evaluator component 16 using the transaction contextual data 12. The condensed authentication assessment indicator 15 may serve as a single condensed indicator of inferred inferences, such as country/location of the device of the transaction-initiating entity 102 in reference to the country/location of the transaction-initiating entity 102 as known to the second evaluating entity 110, or both of the above, based on the transaction 103.

Sharing the initial authentication assessment information 14 may pose a risk of causing inefficiency due to inconsistency. For example, if only a probability score (e.g., assessing a level of authenticity) from first evaluating entity's predictive model is shared, then the initial authentication assessment information 14 may not be insightful, as second evaluating entities 110 may need to have visibility on the calibration of the probability score to understand an accuracy of the score. Moreover, information provided may be less insightful to second evaluating entities 110 if various first evaluating entities 104 share a probability score, derived by various types of different models with varying levels of accuracy. Another risk may include a first evaluating entity sharing an additional confidence in any attribute of the initial authorization assessment information 14, such as, low, medium or high assessed level of authenticity. Questions may be raised regarding 'how low is low' or vice versa and may relate to varying interpretations level by the second evaluating entities 110.

As such, authenticity evaluator component 16 of a first evaluating entity 104 may perform a calibration process 20 on the initial authentication assessment information 14 for consistency. The authenticity level may be visible for all parties based on accumulated data. The calibration process 20 may make adjustments to minimize and/or remove errors in the authenticity level and/or any errors in the initial authentication assessment information 14. During the calibration process 20, authenticity evaluator component 16 may incorporate a standard format, e.g., normalized variables and normalized variable values, for the initial authentication assessment information 14 and/or the condensed authentication assessment indicator 15 in order for this data to be quantitative and have consistent definitions that may be interpreted in the same way by all parties, namely the first evaluating entity 104 who will share this information and the second evaluating entity 110 who will accept and use this information that is shared.

The standard format of the data for the first evaluating entity assessment information 14 and/or the condensed authentication assessment indicator 15 may depend on the channel being used to transmit the first evaluating entity assessment information 14 and/or an amount of data that may be supported for transmission in that channel. In addition, the standard format of the data for the first evaluating entity assessment information 14 and/or the condensed authentication assessment indicator 15 may depend on a time limit for authorizing the transaction. Where the scope allows for a binary signal to be transmitted, an overall trust indicator may be shared as the initial authentication assessment information 14 and/or the condensed authentication assessment indicator 15. Where the scope allows to share a single indicator variable, an ordinal value representing the initial authentication assessment information 14 and/or the condensed authentication assessment indicator 15 of an authenticity level of the transaction 103 or a quantitative indicator of any other implicit variables or a combination of these can be shared.

Where the scope allows to share a single indicator variable and a description, in addition to the above stated idea for the indicator variable, additional descriptions can be used to share reasons for the authenticity assessment for the transaction 103 or additional contextual indicators may be included in the initial authentication assessment information 14. The details in the description may be made free form to help with investigation and understanding or be made ordinal to use as additional data elements for evaluation by the second evaluating entity 110.

Where the scope allows to share two indicator variables an ordinal value representing the overall assessment of authenticity for the transaction 103 may be used as one indicator and quantitative or ordinal variables of implicit attributes driving the overall assessment can be shared as the initial authentication assessment information 14 and/or the condensed authentication assessment indicator 15.

Where the scope allows to share set of raw data variables not limiting to indicators or flags a standardization can be achieved to not transmit private or competitive data but still transmit actionable insight as the initial authentication assessment information 14 and/or the condensed authentication assessment indicator 15. The standardization of the raw data may be achieved by aggregation and categorization of data elements.

Authenticity evaluator component 16 may transmit the initial authentication assessment information 14 and/or the condensed authentication assessment indicator 15 to one or more of an transaction network processing entity 106, a transaction network 108, and/or an issuing 110, so that the first evaluating entity assessment information 14 may be used by the second evaluating entity 110 to make a better evaluation of the transaction 103 based on the additional information represented by the first evaluating entity assessment information 14 and/or the condensed authentication assessment indicator 15.

The second evaluating entity 110 may utilize processor 30 and/or memory 32 and execute authenticity determiner 27 to make the authentication decision 111 to approve the transaction 103, challenge the transaction 103, or reject the transaction 103. Authenticity evaluator component 16 may receive the authentication decision 111 from the second evaluating entity 110.

Referring now to FIG. 4, illustrated is an example chart 400 with a binary signal for the initial authentication assessment information 14 and/or the condensed authentication assessment indicator 15. Where the scope allows for a binary signal to be transmitted, a single binary value (e.g., an authenticity assessment value or trust indicator or authenticity assessment value 404) will be shared as the initial authentication assessment information 14 and/or the condensed authentication assessment indicator 15. The insight shared in initial authentication assessment information 14 and/or the condensed authentication assessment indicator 15 may be at the granularity of overall trust indicator of the transaction 103 or an implicit corresponding authentication data category, also referred to as an authentication category variable 402, which may be agreed upon as appropriate by all parties involved. Such parties include the first evaluating entity 104 who will share the initial authentication assessment information 14 and the second evaluating entity 110 who will accept and use the initial authentication assessment information 14 and/or the condensed authentication assessment indicator 15. Each authorization data category or authentication category variable 402 may correspond to a different authorization factor that may be taken into account to predict an authenticity of the transaction 103.

Chart 400 represents some representative examples of formats for each of these authentication category variables 402 to convey consistent and quantitative definitions in a binary format. For example, trust indicators or authenticity assessment values 404 may be associated with a specific authentication assessment category 402, which may define an authentication factor (e.g., transaction assessment, device history, shipping location history, and/or transaction instrument on file) that may be taken into account to predict an authenticity of the transaction 103. The trust indicators or authenticity assessment values 404 may define the initial authentication assessment information 14 and/or the condensed authentication assessment indicator 15 in a binary format (e.g., a "0" or a "1") for each authentication assessment category 402.

For each trust indicator or authenticity assessment value 404 associated with each authentication assessment category 402, there may be a corresponding standard value definition 406 and/or additional insight 408 that may be inferred from the trust indicator or authenticity assessment value 404 by the second evaluating entity 110. The standard value definition 406 and/or additional insight 408 for may be referred to herein individually or jointly as the assessment category value definition. For example, for authentication assessment category 402 of "device history," and authenticity assessment value 404 of "1," the value definition 406 may be known as "device known from previous transaction," and the value insight 408 may be known as "known device with predicted/likely low risk of non-authentic transaction." By having a standard value definition 406 and/or standard additional insight 408, the initial authentication assessment information 14 and/or the condensed authentication assessment indicator 15 may be quantitative and have consistent meaning that may be interpreted in a same way by all parties. The parties herein include the first evaluating entity 104 which will share the initial authentication assessment information 14 and/or the condensed authentication assessment indicator 15, and the second evaluating entity 110, which will receive and use the initial authentication assessment information 14 and/or the condensed authentication assessment indicator 15.

Referring now to FIG. 5, an example chart 500 includes a selectable single authorization assessment indicator value 504 that may be used as or with the first evaluating entity assessment information 14 and/or the condensed authentication assessment indicator 15 (FIG. 3). Where the scope allows to share a single indicator value 504, an ordinal value representing the initial authentication assessment information 14 and/or the condensed authentication assessment indicator 15 of authenticity of the transaction 103 (FIG. 3) and/or a quantitative indicator of any other implicit variables or a combination of these can be shared.

Chart 500 includes some representative examples of formats for two or more different, selectable single authentication assessment indicator values 504 for a number of different authentication categories 502 associated with the transaction 103. In addition, chart 500 includes examples of different authentication assessment value definitions 506 and/or insights 508 (referred to herein individually or jointly as authentication assessment value definitions) associated with each selectable single authentication assessment indicator value 504. As such, a selected single authentication assessment value 504 provided to the second evaluating entity 110 may convey consistent and quantitative definitions. As such, each selected single authentication assessment indicator value 504 may be interpreted similarly by the first evaluating entity 104 and the second evaluating entity 110. The insights 508 may be used by the second evaluating entity 110 in determining the authentication decision 111 for the transaction 103. For example, for a authentication category 502 of "location assessment," a value 504 of "1" may have a standard value definition 506 of "location/city where transaction originates is same as known city associated with the user," and the value insight 508 may convey information such as "local transaction, low risk." As such, the value definition 506 and/or value insights 508 provided to the second evaluating entity 110 when receiving a value 504 of "1" for a location assessment category 502 may be known and easily understood based on consistent and quantitative definitions.

By having consistent and/or quantitative definitions, all parties, namely the first evaluating entity 104 who will share the initial authentication assessment information 14 and/or the condensed authentication assessment indicator 15, and the second evaluating entity 110 who will receive and use the initial authentication assessment information 14 and/or the condensed authentication assessment indicator 15 that is shared, may interpret the information in the same manner.

Figure 6:
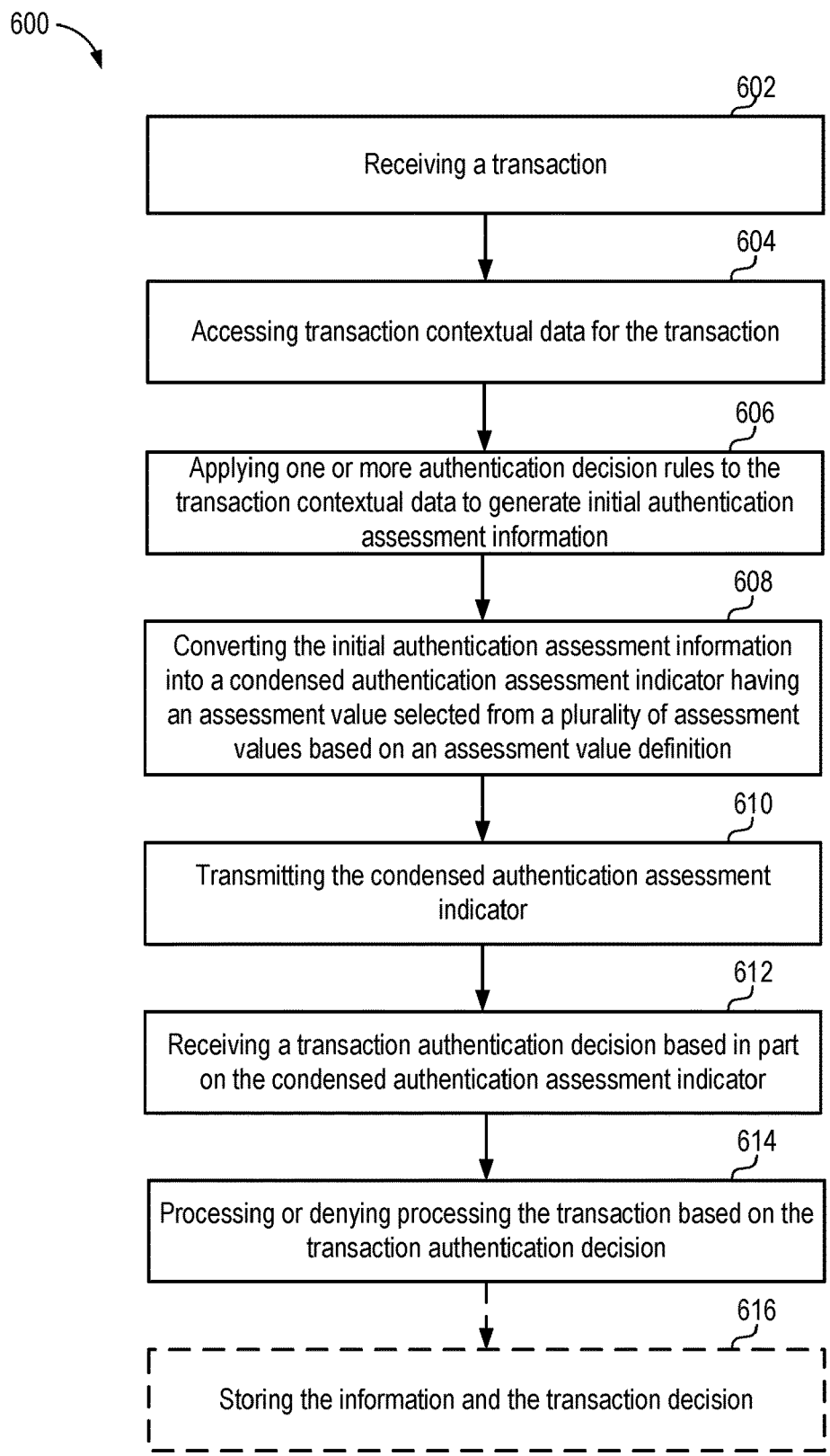
FIG. 6 is an example method flow for making transaction assessments in accordance with an implementation of the present disclosure.

Referring now to FIG. 6, an example method 600 may be used by a computer device 302 (FIG. 3) of a first evaluating entity 104 (FIG. 3) for in-line transaction assessments and/or sharing transaction contextual data. The actions of method 300 may be discussed below with reference to the architecture of FIG. 3.

At 602, method 600 may include receiving at least one transaction. Computer device 302 may include an authenticity evaluator component 16 that receives one or more transactions 103, as described above.

At 604, method 600 may include accessing transaction contextual data for the at least one transaction. Authenticity evaluator component 16 may access transaction contextual data 12 associated with the transactions 103, as described above.

At 606, method 600 may include applying one or more authenticity decision rules to the transaction contextual data to generate initial authentication assessment information. Authenticity evaluator component 16 may apply one or more authenticity decision rules 24 to the transaction contextual data 12 to determine the initial authentication assessment information 14, which may indicate a level of authenticity for the transaction 103 relative to an authenticity threshold level 22. The one or more authenticity decision rules 24 may include, for example, a trained machine learning model and/or a set of rules to determine a level of authenticity for the transaction 103 and/or classify the transaction 103. The level of authenticity may be used to determine a transaction classification 26 to approve, challenge, or reject the transaction 103.

For example, the level of authenticity may be one of a low authenticity, a medium authenticity, or a high authenticity relative to the authenticity threshold level 22. With machine learning models, the level of authenticity may be defined based on the scores 18. With rules, first evaluating entity can classify transactions 103 into multiple levels of authenticity segments based on predetermined authenticity decision rules 24 and the corresponding initial authentication assessment information 14. For example, transactions 103 from some geolocations, using certain devices may have an assessed high authenticity level; from other geolocations, and with other certain devices may have a medium or a low assessed authenticity level.

The initial authentication assessment information 14 may include the level of authenticity for the transaction 103. The initial authentication assessment information 14 may also include the transaction classification 26. As such, the initial authentication assessment information 14 may be inferred data attributes in response to applying one or more authenticity decision rules 24.

At 608, method 600 may include converting the initial authentication assessment information into a condensed authentication assessment indicator having an assessment value selected from a plurality of assessment values based on an assessment value definition. For example, in an aspect, authenticity evaluator component 16 is configured to converting the initial authentication assessment information into a condensed authentication assessment indicator having an assessment value selected from a plurality of assessment values based on an assessment value definition, as described above.

For example, the initial authentication assessment information 14 may include or may be converted into the form of the condensed authentication indicator 15 computed by the authenticity evaluator component 16 using the transaction contextual data 12. The condensed authentication indicator 15 may serve as a single condensed indicator. Example condensed authentication indicators 15 may include, but are not limited to, indicators 404 (FIG. 4) and/or indicators 504.

Authenticity evaluator component 16 may incorporate a standard format e.g., normalized variables and normalized variable values, associated with the condensed authentication indicator 15 in order for the condensed authentication indicator 15 to be quantitative and have consistent definitions that may be interpreted in the same way by all parties involved in evaluating the transaction 103.

The standard format of the data for the condensed authentication indicator 15 may depend on the channel being used to transmit the condensed authentication indicator 15 and/or an amount of data that may be supported for transmission in that channel. For example, one second evaluating entity 110 or transaction network 108 may support a binary signal, while another second evaluating entity 110 or transaction network 108 may support five words. Another example may include a second evaluating entity 110 that supports one word and a transaction network processing entity 106 supports a binary signal. As such, different channels may support different formats for the condensed authentication indicator 15. In addition, the standard format of the data for the condensed authentication indicator 15 may depend on a time limit for authorizing the transaction.

Where the scope allows for a binary signal to be transmitted, an overall authentication trust indicator may be shared as the condensed authentication indicator 15. Where the scope allows to share a single indicator variable, the condensed authentication indicator 15 may be an ordinal value representing an authenticity level of the transaction 103 or a quantitative indicator of any other implicit variables or a combination of these can be shared.

In some implementations, the assessment value corresponds to an authentication category variable of a plurality of authentication category variables associated with the transaction, wherein the authentication category variable and the assessment value identify an initial assessed level of authenticity of the transaction.

In some implementations, the condensed authentication assessment indicator comprises a plurality of different assessment category values associated with a plurality of different authentication category variables, wherein each of the plurality of different authentication category variables correspond to a different one of a plurality of authenticity assessment factors, and wherein each of the plurality of different assessment category values is based on a different one of a plurality of different assessment category value definitions In some implementations, the plurality of authenticity assessment factors are selected from a group consisting of a transaction assessment factor, a device history assessment factor, a location assessment factor, a transaction data assessment factor, and a combined factor assessment factor.

At 610, method 600 may include transmitting the condensed authentication assessment information. Authenticity evaluator component 16 may transmit the condensed authentication indicator 15 to one or more of an transaction network processing entity 106, a transaction network 108, and/or an second evaluating entity 110, so that the condensed authentication indicator 15 may be used by the second evaluating entity 110 to make a better evaluation of the transaction 103 based on the additional information represented by the condensed authentication indicator 15.

For example, authenticity evaluator component 16 may establish a secondary data channel 112 from the first evaluating entity 104 or first evaluating entity's authenticity solution provider to the second evaluating entity 110; or establish a data channel from the first evaluating entity or first evaluating entity's authenticity solution provider to a conduit or a trust knowledge broker which may be the same as or integrated with the transaction network processing entity 106 or transaction network 108, which will then be delivered to the second evaluating entity 110 either in a secondary data channel or the primary authorization data channel.

At 612, method 600 may include receiving a transaction authentication decision based in part on the condensed authentication assessment information. The second evaluating entity 110 may make a transaction authorization decision 111 to approve the transaction 103, challenge the transaction 103, or reject the transaction 103. Authenticity evaluator component 16 may receive the transaction authorization decision 111 from the second evaluating entity 110.

At 614, method 600 may include processing or denying processing the transaction based on the transaction authentication decision. For example, in an aspect, authenticity evaluator component 16 may be configured to process or deny processing the transaction 103 based on the transaction authentication decision 111, as described above.

Optionally, at 616, method 600 may include storing the transaction contextual data, the initial authorization assessment information, the condensed authentication assessment indicator, and/or the transaction authorization decision. Authenticity evaluator component 16 may store the received transaction authorization decision 111, the initial authentication assessment information 14, the condensed authentication assessment indicator 15, and/or the transaction contextual data 12 for the transaction 103. The stored information may be used for future modeling and/or training the machine learning model for improving the accuracy of the condensed authentication assessment indicator.

As such, method 600 may be used by the second evaluating entity 110 to make a better evaluation of the transaction 103 based on the additional information represented by the transaction contextual data, the initial authorization assessment information, and/or the condensed authentication assessment indicator.

Referring now to FIG. 7, an example process 700 of building machine learning models and/or setting decision rules may be used for determining different levels of risk or authenticity 704, 706, 708 in graph 702. The process of building machine learning models and/or setting decision rules 700 may occur offline by, for example, computer device 302 (FIG. 3) or any other computer device.

First evaluating entities may use stored transaction data (authenticity label, and other features associated with historical transactions and/or historical transaction data) or forecasting data to train machine learning models and/or to set risk or authenticity decision rules 700. The machine learning model training and/or setting risk or authenticity decision rules 700 may use part of the historical transactions data stored in a database of first evaluating entities database to forecast eventual authenticity rates to periodically train machine learning models and/or to set decision rules for assessing authenticity of new coming transactions. For example, transactions originating from some certain geolocation with certain devices may be considered to have a low authenticity level based on historical observation. There may be latency in receiving completed and/or true authenticity labels from second evaluating entity 110 for some historical transactions. As such, the machine learning model training and/or setting the authenticity decision rules 700 may use partially obtained authenticity labels to forecast complete authenticity volume for each score bin.

The historical transactions data used by the machine learning model training and/or setting the authenticity decision rules 700 may include historical transactions with associated original (raw) features, such as, product type, purchase amount, geolocation, etc., and aggregated features, such as, account, device, location, distance, etc. The historical transactions data may also include forecasting data (using historical data), associated authenticity decisions, machine learning generated scores, and/or a true authenticity label (e.g., authentic or not-authentic).

Based on either machine leaning model and/or setting the authenticity decision rules 700, first evaluating entities can have three or more levels of authenticity 704, 706, 708, or rates of non-authenticity, defined (i.e., high authenticity or low risk/low non-authenticity rate, medium authenticity or medium risk/medium non-authenticity rate, low authenticity or high risk/high non-authenticity rate) for all the incoming transactions. With machine learning models, the level of authenticity may be defined based on the scores 18 (FIG. 3) of the initial authentication assessment information 14 (FIG. 3).

With rules, first evaluating entity can classify transactions 10 into three or more levels of authenticity 704, 706, 708 based on predetermined authenticity decision rules 24 (FIG. 3). For example, system may be adjust the non-authenticity rates to define different segments or zones each having a target level of risk and/or rate of non-authenticity. For example, a first segment may be defined to have the total non-authentic rate of <0.1%. A second segment/zone may be set to have the total non-authentic rate being >0.1% and <5%, while a third zone/segment may be set of have a non-authenticity rate of >5%, resulting in the three levels of authenticity 704, 706, 708 being determined.

For example, transactions 103 originating from some geolocations, using certain devices may be associated with high authenticity (or low non-authenticity rates) and hence low risk, e.g., the first segment/zone 704; while transactions 103 originating from other geolocations, and with other certain devices are associated with medium authenticity (or medium non-authenticity rates) and hence medium risk, e.g., second segment/zone 706, or low authenticity (or high non-authenticity rates) and hence high risk, e.g., third segment/zone 708. The boundaries of each segment/zone may be adjustable and may be set based on the predicted non-authenticity rates determined using the machine learning generated score or rules.

Figure 8:
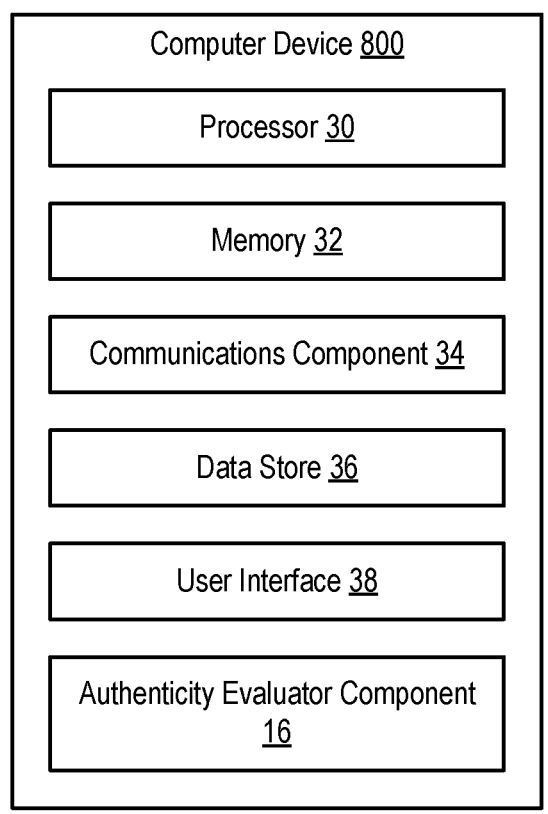
FIG. 8 is a schematic block diagram of an example computer device in accordance with an implementation of the present disclosure.

Referring now to FIG. 8 an example computer 800 that may be configured as computer device 302 in accordance with an implementation includes additional component details as compared to FIG. 3. In one example, computer 800 may include processor 30 for carrying out processing functions associated with one or more of components and functions described herein. Processor 30 can include a single or multiple set of processors or multi-core processors. Moreover, processor 30 can be implemented as an integrated processing system and/or a distributed processing system.

Computer 800 may further include memory 32, such as for storing local versions of applications being executed by processor 30. Memory 32 can include a type of memory usable by a computer, such as random access memory (RAM), read only memory (ROM), tapes, magnetic discs, optical discs, volatile memory, non-volatile memory, and any combination thereof. Additionally, processor 30 may include and execute operating system 310 (FIG. 3).

Further, computer 800 may include a communications component 34 that provides for establishing and maintaining communications with one or more parties utilizing hardware, software, and services as described herein. Communications component 34 may carry communications between components on computer device 302, as well as between computer device 302 and external devices, such as devices located across a communications network and/or devices serially or locally connected to computer device 302. For example, communications component 34 may include one or more buses, and may further include transmit chain components and receive chain components associated with a transmitter and receiver, respectively, operable for interfacing with external devices.

Additionally, computer 800 may include a data store 36, which can be any suitable combination of hardware and/or software, that provides for mass storage of information, databases, and programs employed in connection with implementations described herein. For example, data store 36 may be a data repository for authenticity evaluator component 16.

Computer 800 may also include a user interface component 38 operable to receive inputs from a user of computer device 302 and further operable to generate outputs for presentation to the user. User interface component 38 may include one or more input devices, including but not limited to a keyboard, a number pad, a mouse, display (e.g., which may be a touch-sensitive display), a navigation key, a function key, a microphone, a voice recognition component, any other mechanism capable of receiving an input from a user, or any combination thereof. Further, user interface component 38 may include one or more output devices, including but not limited to a display, a speaker, a haptic feedback mechanism, a printer, any other mechanism capable of presenting an output to a user, or any combination thereof.

In an implementation, user interface component 38 may transmit and/or receive messages corresponding to the operation of authenticity evaluator component 16. In addition, processor 30 executes authenticity evaluator component 16, and memory 32 or data store 36 may store it.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device for securing electronic transactions in a computing network, comprising:
    a memory to store data and instructions;
    at least one processor configured to communicate with the memory; and
    an operating system in communication with the memory and the at least one processor, wherein the operating system is operable to:
        receive a transaction;
        access transaction contextual data for the transaction;
        apply one or more authentication decision rules to the transaction contextual data to determine initial authentication assessment information for the transaction;
        convert the initial authentication assessment information into a condensed authentication assessment indicator having an assessment value selected from a plurality of assessment values based on an assessment value definition;
        transmit, by the computer device to a payment processor, the condensed authentication assessment indicator for the transaction;
        receive, by the computer device from the payment processor, a transaction authentication decision based in part on the condensed authentication assessment indicator, wherein the condensed authentication assessment indicator comprises a standard format configured to provide the initial authentication assessment information as quantitative and consistent information or definitions that are interpreted in a same way by the computer device and by the payment processor;
        process or deny processing the transaction, by the computer device, based on the transaction authentication decision; and
        periodically train the one or more authentication decision rules via a machine learning model using historical transaction data, wherein latency in receiving completed or true authenticity labels from the payment processor for some historical transactions causes the machine learning model to be trained using partially obtained authenticity labels to forecast complete authenticity volume for each score bin.

2. The computer device of claim 1, wherein the assessment value corresponds to an authentication category variable of a plurality of authentication category variables associated with the transaction, wherein the authentication category variable and the assessment value identify an initial assessed level of authenticity of the transaction.

3. The computer device of claim 1, wherein the assessment value of the condensed authentication assessment indicator comprises a binary value.

4. The computer device of claim 1, wherein the assessment value of the condensed authentication assessment indicator comprises an ordinal value.

5. The computer device of claim 1, wherein the condensed authentication assessment indicator comprises a plurality of different assessment category values associated with a plurality of different authentication category variables, wherein each of the plurality of different authentication category variables correspond to a different one of a plurality of authenticity assessment factors, and wherein each of the plurality of different assessment category values is based on a different one of a plurality of different assessment category value definitions.

6. The computer device of claim 5, wherein the plurality of authenticity assessment factors are selected from a group consisting of a transaction assessment factor, a device history assessment factor, a location assessment factor, a transaction data assessment factor, and a combined factor assessment factor.

7. The computer device of claim 1, wherein the standard format of the condensed authentication assessment indicator is determined in response to one or more of an amount of data supported by a channel being used to transmit the condensed authentication assessment indicator or a time limit for authorizing the transaction.

8. The computer device of claim 1, wherein the standard format of the condensed authentication assessment indicator includes one or more of a binary signal, a single indicator variable, a description, two or more indicator variables, or a raw data variable.

9. The computer device of claim 1, wherein the condensed authentication assessment indicator provides the quantitative and consistent information or definitions for use with determining the transaction authentication decision.

10. The computer device of claim 1, wherein the operating system is further operable to:
perform a calibration process on the initial authentication assessment information to minimize errors in the initial authentication assessment information, wherein the calibration process converts the initial authentication assessment information into normalized variables and normalized variable values that are interpreted in the same way by the computer device and by the payment processor.

11. The computer device of claim 1, wherein the payment processor is associated with a payment instrument identified in the transaction contextual data, wherein, in order to transmit the condensed authentication assessment indicator and receive the transaction authentication decision, the operating system is further operable to:
transmit, from the computer device to the payment processor via a transaction network, the condensed authentication assessment indicator by using a secondary data channel; and
receive, by the computer device from the payment processor via the transaction network, the transaction authentication decision based in part on the condensed authentication assessment indicator.

12. A method of securing electronic transactions in a computing network, comprising:
receiving a transaction;
accessing transaction contextual data for the transaction;
applying one or more authentication decision rules to the transaction contextual data to determine initial authentication assessment information for the transaction;
converting the initial authentication assessment information into a condensed authentication assessment indicator having an assessment value selected from a plurality of assessment values based on an assessment value definition;
transmitting, by a computer device to a payment processor, the condensed authentication assessment indicator for the transaction;
receiving, by the computer device from the payment processor, a transaction authentication decision based in part on the condensed authentication assessment indicator, wherein the condensed authentication assessment indicator comprises a standard format configured to provide the initial authentication assessment information as quantitative and consistent information or definitions that are interpreted in a same way by the computer device and by the payment processor;
processing or denying the processing of the transaction, by the computer device, based on the transaction authentication decision; and
periodically train the one or more authentication decision rules via a machine learning model using historical transaction data, wherein latency in receiving completed or true authenticity labels from the payment processor for some historical transactions causes the machine learning model to be trained using partially obtained authenticity labels to forecast complete authenticity volume for each score bin.

13. The method of claim 12, wherein the assessment value corresponds to an authentication category variable of a plurality of authentication category variables associated with the transaction, wherein the authentication category variable and the assessment value identify an initial assessed level of authenticity of the transaction.

14. The method of claim 12, wherein the assessment value of the condensed authentication assessment indicator comprises a binary value.

15. The method of claim 12, wherein the assessment value of the condensed authentication assessment indicator comprises an ordinal value.

16. The method of claim 12, wherein the condensed authentication assessment indicator comprises a plurality of different assessment category values associated with a plurality of different authentication category variables, wherein each of the plurality of different authentication category variables correspond to a different one of a plurality of authenticity assessment factors, and wherein each of the plurality of different assessment category values is based on a different one of a plurality of different assessment category value definitions.

17. The method of claim 16, wherein the plurality of authenticity assessment factors are selected from a group consisting of a transaction assessment factor, a device history assessment factor, a location assessment factor, a transaction data assessment factor, and a combined factor assessment factor.

18. The method of claim 12, wherein the standard format of the condensed authentication assessment indicator is determined in response to one or more of an amount of data supported by a channel being used to transmit the condensed authentication assessment indicator or a time limit for authorizing the transaction.

19. The method of claim 12, wherein the standard format of the condensed authentication assessment indicator includes one or more of a binary signal, a single indicator variable, a description, two or more indicator variables, or a raw data variable.

20. The method of claim 12, wherein the condensed authentication assessment indicator provides the quantitative and consistent information or the definitions for use with determining the transaction authentication decision.

21. The method of claim 12, further comprising:
performing a calibration process on the initial authentication assessment information to minimize errors in the initial authentication assessment information, wherein the calibration process converts the initial authentication assessment information into normalized variables and normalized variable values that are interpreted in the same way by the computer device and by the payment processor.

22. The method of claim 12,
wherein the payment processor is associated with a payment instrument identified in the transaction contextual data,
wherein transmitting the condensed authentication assessment indicator further comprises transmitting, from the computer device to the payment processor via a transaction network, the condensed authentication assessment indicator by using a secondary data channel, and
wherein receiving the transaction authentication decision further comprises receiving, by the computer device from the payment processor via the transaction network, the transaction authentication decision based in part on the condensed authentication assessment indicator.

23. A non-transitory computer-readable medium comprising stored instructions executable by a processor to secure electronic transactions in a computing network, comprising instructions executable to:

receive a transaction;

access transaction contextual data for the transaction;

apply one or more authentication decision rules to the transaction contextual data to determine initial authentication assessment information for the transaction;

convert the initial authentication assessment information into a condensed authentication assessment indicator having an assessment value selected from a plurality of assessment values based on an assessment value definition;

transmit, by a computer device to a payment processor, the condensed authentication assessment indicator for the transaction;

receive, by the computer device from the payment processor, a transaction authentication decision based in part on the condensed authentication assessment indicator, wherein the condensed authentication assessment indicator comprises a standard format configured to provide the initial authentication assessment information as quantitative and consistent information or definitions that are interpreted in a same way by the computer device and by the payment processor;

process or deny processing the transaction, by the computer device, based on the transaction authentication decision; and periodically train the one or more authentication decision rules via a machine learning model using historical transaction data, wherein latency in receiving completed or true authenticity labels from the payment processor for some historical transactions causes the machine learning model to be trained using partially obtained authenticity labels to forecast complete authenticity volume for each score bin.

* * * * *